L. C. Wilder,
Corn Harvester.
No. 19221.    Patented Jan. 26, 1858.
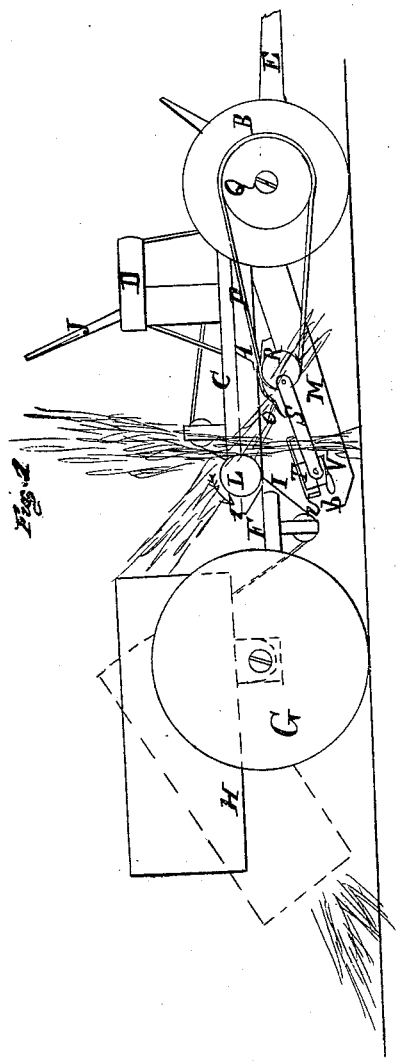
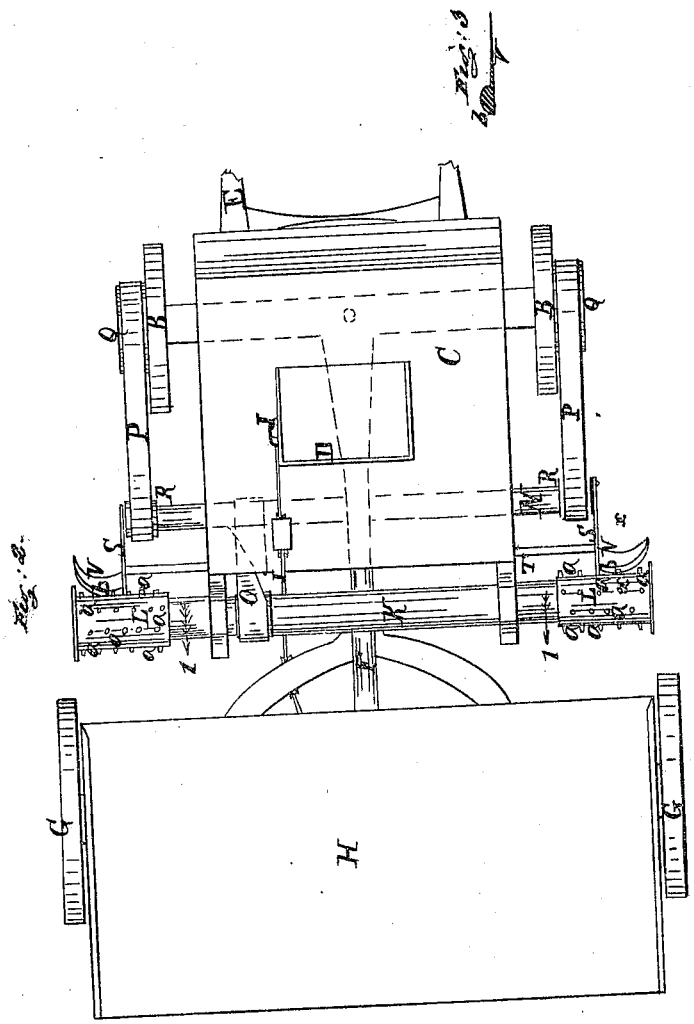

UNITED STATES PATENT OFFICE.

L. C. WILDER, OF LEXINGTON, NORTH CAROLINA.

IMPROVEMENT IN CORN-HARVESTERS.

Specification forming part of Letters Patent No. 19,221, dated January 26, 1858.

*To all whom it may concern:*

Be it known that I, L. C. WILDER, of Lexington, in the county of Davidson and State of North Carolina, have invented a new and Improved Indian-Corn or Maize Harvester; and I do hereby declare that the following is a full, clear, and exact description of the same, reference being had to the annexed drawings, making a part of this specification, in which—

Figure 1 is a side view of my improvement. Fig. 2 is a plan or top view of the same. Fig. 3 is a detached section of one of the cutters, taken in the line $x\ x$, Fig. 2.

Similar letters of reference indicate corresponding parts in the several figures.

This invention consists in the employment or use of flanged reciprocating cutters and feed-rollers, in combination with a tilting platform or stalk-receiver, the parts being operated and arranged relatively with each other as hereinafter described.

To enable others skilled in the art to fully understand and construct my invention, I will proceed to describe it.

A represents a rectangular frame, the front part of which is supported by two wheels, B B. The frame A is covered by a platform, C, on which the driver's seat D is placed.

E are shafts, which are attached to the front of the frame A.

To the axle of the wheels B B of the frame A the front end of a perch, F, is pivoted, the back end of said perch being attached to an axle having a wheel, G, at each end.

On the axle of the wheels G a platform, H, is placed, said platform being secured to the axle by straps, or arranged in any suitable way, so that it may tilt, the back end of the platform being heavier than the front, or the platform so placed on the axle that its back end will overbalance its front end, the platform being prevented from tilting, when not required, by means of a cord or chain, I, one end of which is attached to the front end of the platform and the opposite end to the lower end of a lever, J, which is pivoted to one side of the driver's seat D.

On the back end of the frame A a shaft, K, is placed, and each end of the shaft, for a certain distance, is made of a larger diameter than the other portion, as shown clearly at L L, Fig. 2. These enlarged portions L L are provided with radial teeth $a$, as shown clearly in Fig. 2. The toothed portions L L of the shaft K are opposite the ends of the platform H.

To the under side of the frame A two inclined bars, M, are attached—one at each side of the frame—the front ends of the bars M being secured to the front end of the frame, so that their back ends will incline toward the ground. (See Fig. 1.)

N is a shaft, which is placed in suitable bearings on the bars M, about midway between their front and back ends. The shaft N is parallel with the shaft K, and the shaft K is driven from shaft N by a belt, O. The shaft N is driven by belts P, which pass around pulleys Q, attached to the outer sides of the wheels B B, said belts passing around pulleys R at the ends of the shaft N.

To each pulley R a connecting-rod, S, is attached, said rods being attached at one end to the pulleys near their peripheries, the opposite ends of the rods being attached to the ends of a bar, T, which is fitted in guide-loops U on the upper ends of the bars M M. The ends of the bar T project a certain distance beyond the sides of the bars M, and to each end of bar T a cutter, V, is attached. The cutters V are of sickle or curved form, as shown clearly in Fig. 2, and they are in line with the toothed portions L of the shaft K. The back edge of each cutter V has a rim or flange, $b$, attached to it, and these flanges project upward, as shown clearly in Fig. 2.

The operation is as follows: As the machine is drawn along a reciprocating motion is given the bar T and cutters V V by means of the rods S, attached to the crank-pulleys R, and the cutters, on account of the bar T resting on the inclined bars M, and of course in an inclined plane, cut the cornstalks obliquely with their fiber. A cutter V moves directly over a row of corn, the body of the machine being of such a width as to insure this. The flanges $b$ of the cutters, as the cutters move forward and after the stalks are cut, throw forward the butts, and the tops of the stalks are thereby canted over on the rollers or enlarged portions L of the shaft K, which, in consequence of being rotated by the belt O in the direction indicated by arrow 1, feed the cut stalks on the platform or receiver H. (See red lines, Fig. 1.) When a sufficient quantity of cut stalks has been placed on the platform or receiver H the driver on the seat D shoves forward the upper end of the lever J, and the cord or chain I being thereby slackened, the platform or receiver H is allowed to tilt, as shown by the dotted lines, Fig. 1, and the corn is dumped on the ground. The platform is then raised to a horizontal position by shoving backward the upper end of lever J, and when again filled with cut stalks is tilted, as before.

I do not claim separately or in themselves considered any of the within-described parts; but,

Having thus described my invention, what I claim as new, and desire to secure by Letters Patent, is—

The combination of the oblique reciprocating flanged cutters V V, feed-rollers L L, and tilting platform H, arranged to operate substantially as and for the purpose set forth.

L. C. WILDER.

Witnesses:
JOHN P. MABRY.
J. H. MABRY.